(12) United States Patent
Rajala

(10) Patent No.: US 7,796,051 B2
(45) Date of Patent: Sep. 14, 2010

(54) MEASURING DEVICE ACTIVATED AT INSPECTION ROUNDS FOR CONDITION MONITORING OF ROTATING MACHINERY

(75) Inventor: Juha Rajala, Kalix (SE)

(73) Assignee: Electrotech AB, Kalix (SE)

( * ) Notice: Subject to any disclaimer, the term of this patent is extended or adjusted under 35 U.S.C. 154(b) by 590 days.

(21) Appl. No.: 11/791,477

(22) PCT Filed: Nov. 24, 2005

(86) PCT No.: PCT/SE2005/001766

§ 371 (c)(1),
(2), (4) Date: May 24, 2007

(87) PCT Pub. No.: WO2006/057605

PCT Pub. Date: Jun. 1, 2006

(65) Prior Publication Data

US 2007/0247285 A1 Oct. 25, 2007

(30) Foreign Application Priority Data

Nov. 24, 2004 (SE) .................................. 0402922

(51) Int. Cl.
*G08B 21/00* (2006.01)
(52) U.S. Cl. ..................................... 340/683; 340/679
(58) Field of Classification Search .................. 340/683
See application file for complete search history.

(56) References Cited

U.S. PATENT DOCUMENTS

| 3,641,550 A * | 2/1972 | Lynas et al. .................... 73/583 |
|---|---|---|
| 5,325,339 A * | 6/1994 | Yost et al. ..................... 367/13 |
| 5,491,468 A | 2/1996 | Everett et al. |
| 5,898,388 A | 4/1999 | Hofmann et al. |
| 6,078,874 A | 6/2000 | Piety et al. |
| 6,205,872 B1 * | 3/2001 | Pflueg ........................ 73/866.5 |
| 6,523,383 B2 | 2/2003 | Joki et al. |
| 2002/0154029 A1 * | 10/2002 | Watters et al. ......... 340/870.07 |
| 2002/0196126 A1 * | 12/2002 | Eisenberg et al. .......... 340/10.2 |
| 2003/0030565 A1 | 2/2003 | Sakatani et al. |
| 2004/0041714 A1 | 3/2004 | Forster |
| 2005/0231350 A1 * | 10/2005 | Littrell et al. ............... 340/511 |

FOREIGN PATENT DOCUMENTS

WO 98/01831 1/1998

* cited by examiner

*Primary Examiner*—Daniel Wu
*Assistant Examiner*—Naomi Small
(74) *Attorney, Agent, or Firm*—Young & Thompson

(57) ABSTRACT

A measuring device (1) enables a handheld RFID receiver (20) to identify the measuring device (1), initiating measurements and receive measurement data relating to the condition of a rotating member of a machine. The measuring device (1) is intended to be mounted on the outside of a machine with at least one rotating member and the measuring device (1) is intended to measure and communicate measurement data relating to the condition of the rotating member. The device is energized and communicates by a magnetic field (21) introduced by the handheld receiver (20). The device (1) is suitable to be used for measurements at inspection rounds at industrial plants.

16 Claims, 4 Drawing Sheets

MEASURING DEVICE ACTIVATED AT INSPECTION ROUNDS FOR CONDITION MONITORING OF ROTATING MACHINERY

TECHNICAL FIELD

The invention relates to measuring devices and systems based on Radio Frequency Identification (RFID) technology. The invention relates more specifically to measuring devices and systems that, in addition to communicate a RFID identity between a transmitter and a receiver, also communicate measurement data of a physical measurement.

BACKGROUND ART

Inspection rounds are frequently performed at many plants. An inspection round involves that a person, such as a member of the plant operation team, moves through certain sections of a plant in order to inspect the status or condition of equipment, as well as status of production. Examples of such plants are process industries, ships and commercial buildings. At these types of plants, and similar plants, there are large numbers of equipment of different types with at least one rotating member. This type of equipment, such as a rotating machine, is typically monitored at inspection rounds, by means of embedded electronics, by means of control systems or in different combinations of these approaches for monitoring. In process industries it is common that equipment that are critical for manufacturing and/or for running a process are monitored on-line, for instance by local control means or by a distributed control system. Other types of machines, with at least one rotating member, that are considered non-critical are often not monitored on-line due to cost reasons. Examples of such machines are fans, certain pumps and conveyors for waste. Such non-critical equipment may be remotely located at a plant. Measurements based on autonomous measurement methods are rarely applied on such equipment or machines. A reason is that available methods are based on measurement devices and systems that are fairly expensive, difficult to install, costly to maintain or that measurement data are difficult to interpret. A much more common approach is that a deviation from a normal state of operation of such a rotating machine is individually evaluated by a person at an inspection round. Such an evaluation is often based on that the person listens in order to detect sounds and noise and/or touch the equipment to sense if a member of the equipment is unbalanced. A person performing an inspection round may also touch the equipment in order to get an indication on an increasing temperature, which may be due to a defect, for instance in a bearing.

Another problem at inspection rounds is to be able to track if a certain piece of equipment, such as a rotating machine, has been passed at an inspection round within a certain time interval measured from a previous made inspection round. The state of the art shows a number of systems that tracks stations, with time stamps, that persons have passed during inspection rounds. For instance persons of a security company monitoring a building, but the state of the art does not present how to achieve efficient tracking of condition monitoring of equipment, such as rotating machines.

Yet another problem is to, in an efficient manner, enable the identification of equipment with at least one rotating member. In a control system or a maintenance system a certain nomenclature is used to identify different types of objects, for instance rotating machines. A fan may for instance have a tag such as FAN14637. But the tag name used in the control system or the maintenance system is rarely used in order to physically mark the fan, such as with a small sign. Even more unusual is to mark the fan with an electronic identification. And it is unusual that fans, and other rotating machines, that are un-connected to means for computerized communication, hence lacking communication capabilities to a control system, is able to send a unique identifier to a receiving unit. Methods to identify such equipment are commonly based on identification in a computerized plant system, in a maintenance system or in an industrial control system. That a person is unable to identify equipment with at least one rotating member, during an inspection round, is a frequently occurring problem. At many plants a substantial amount of man-hours is spent on that a person standing next to a piece of equipment needs to identify the equipment, for instance in collaboration with a plant operator or another person handling a maintenance system. It is unusual that equipment with a rotating member has a means that enable its identity to be electronically communicated, locally, at the equipment. Even if the equipment is connected to computerized communication network, such as a field bus, and has a unique identifier known within the fieldbus environment, a person being in the vicinity of the equipment is unable to identify the equipment without access to a control system, a maintenance system or similar systems.

RFID devices are available as commercial products. Other commonly used names on an RFID device is an RFID tag or an RFID transponder. An RFID device stores a unique identity that is read by wireless receiver. The receiver may be handheld or mounted at a construction member, for instance at a conveyor belt. An RFID device communicates with a wireless receiver by means of a magnetic field. Other terms that are frequently used in this context are an electric field, radio waves or electromagnetic field. Examples of field of use for RFID are as tags for products, such as tags on containers or boxes, goods, vehicles or steal products. Another example of field of use is as tags on components intended for assembly to a product within a plant.

RFID devices may be active and contain an own source of energy, such as a battery. With RFID units used as tags, for instance for containers, boxes and goods, it may not be an issue that a battery has limited life span. Such a RFID tag is used during the distribution and the logistic handling, hence has no critical function in later stages. An RFID tag that has no planned end-date for use, such an RFID device mounted at a certain position in a plant, the need to change the battery becomes an issue. One draw back is that one may miss out important readings when a battery becomes empty. Another drawback is that RFID devices used in harsh environments may need to be encapsulated in order to withstand dust and moisture, which in turn makes the design of such device advanced and costly in order to be able to change the battery.

RFID devices may also be passive and activated by means of an inductive circuit. Such an RFID device may for instance be activated as it passes an RFID receiver mounted at a conveyor belt. A problem with such a passive RFID device, with an inductive circuit that is energized by means of a magnetic field, is that compared to an active RFID device it is necessary to transfer more energy from the RFID receiver in order for the RFID device to communicate with the receiver. The receiver must energize the device. When a fixed RFID receiver is used the problem might be less severe since the receiver may be continuously supplied with electric energy by wire. But when a handheld RFID receiver is used, the minimization of the transferred amount of energy from the receiver is an issue. A handheld receiver is typically equipped with a re-chargeable battery. The more energy that is needed to activate the RFID devices, the less number of readings is possible before the battery of the handheld receiver needs to be recharged.

Another problem with use of RFID in plants with rotating machines is that the electronics must be protected from the harsh surroundings. This leads to that such an RFID device should be enclosed, preferably airtight and without openings such as covered with a lid. For such an RFID device a regular battery is not an option. Plants with such environments where RFID devices needs to be enclosed, preferably airtight and without openings such as covered with a lid are, for instance, process industries for manufacturing or processing of steel, other metals, pulp, paper, chemical or petrochemical industry. Other examples of plants are sites for production, transport refining of oil, gas or minerals. Other examples of plants are means of transport such as a train or a ship. Other harsh environments where inspection rounds are common are ventilation systems, in particular those with a number of fans, in commercial buildings or apartment buildings.

US 2004/0004131 shows an RFID tag capable of surviving high temperatures. The RFID is enclosed and is made as a laminate of heat resistant material and comprising a window for an RFID generating component. One out of several drawbacks with the tag is that it does not perform any physical measurement.

An RFID device with temperature measurement capability is described in US2004/0041714. A wireless communication unit is described, receiving indications of temperature relating to a container and/or its contents and communicating such a temperature indication together with an identifier to a receiver. The wire less communication unit measures and communicates temperature indications relating to the container in a repeated manner. One out of many remaining problems with the wire less communication unit is that it is not intended or suitable to be mounted on a rotating machine or monitoring a rotating machine. Yet another draw back is that the unit does not perform any vibration measurements.

There are a number of commercial systems for condition monitoring of equipment with at least one rotating member, such as a rotating machine. Such systems are for example a system for vibration measurement or vibration analysis. The systems handle measurements, for instance by means of Fourier analysis or neural networks. Some systems comprise a handheld device, such as a microphone, which a user handles in order to initiate a measurement of a machine. There are known systems which comprise devices/transmitters mounted on a machine. These devices/transmitters are energized by means of electricity through a cable or wire. There are also devices/transmitters with a battery. With previous known devices and systems it is not suitable to use devices that are energized with RFID or technology similar to RFID, as a great amount of energy is used at measurement and transfer of the great amount of data, which is necessary for vibration analysis. Such systems do not have vibration transmitters or devices mounted on machines which are independent of a battery or electric connection. There are systems for condition monitoring that use wireless communication with such a transmitter for instance based on Bluetooth. But a Bluetooth device that is connected to such a transmitter/device is dependent on a battery or an electrical power connection in order to send data from the transmitter.

SUMMARY OF THE INVENTION

An aim of the invention is to solve the above mentioned problems. An object of the invention is to present a measurement device, which enables a handheld receiver to identify the measurement device, initiate measurements performed by the device and communicate measurement data relating to the status of at least one rotating member of a machine, the measurement device communicates an identity and is only energized by wireless transferred energy from the handheld receiver.

This object is achieved by the above mentioned measurement device and is characterized in that the device comprise a component for temperature measurement and one component for vibration measurement, the measurement device comprise a first means configured to activate temperature and vibration measurement, the means and the components for temperature and vibration measurement are energized by means of energy from a generated magnetic field, and the measurement device comprise a second means configured to communicate a unique identity, data from the temperature and vibration measurement to a handheld RFID receiver. Additional characteristics of the measurement device become evident from studying the independent patent claim 1. The measurement device is intended to be mounted on the outside of a machine comprising at least one rotating member and the measurement device is intended to measure and communicate measurement data relating to the status of rotating member. The device is suitable for use at inspection rounds.

An example of the rotating member is a bearing, a shaft, a rotor, a impeller of a fan.

An advantage with the invention is that the measurement device does not have any electrical connection, such as a wire or cord, which simplifies installation of the device and makes it independent of electrical energy from an electrical connection.

A device according to the invention enables to measure and communicate measurement data without the device receiving other energy than the energy from the handheld RFID receiver.

Another advantage is that the device according to the invention is configured to communicate the unique identity to the handheld RFID receiver, this in addition to communicate measurement data to the receiver. The RFID receiver has the same base frequency as the measurement device. Yet another advantage is that a person visiting a machine during an inspection round, may identify the machine without the machine or measurement devices attached to the machine comprises computerized communication means, such as to a field bus.

Yet another advantage with the invention is that the unique identity associated with the machine with the at least rotating member, and measurement data associated to it is transferred from the measurement device, first to the handheld RFID receiver and then to a computer for storage and analysis. Data from a number of machines transferred to the handheld RFID receiver are analyzed by means of the computer, and measurement data from several time of measurement may be merged in the computer by means of the unique identifier. Alternative terms to computer are, but not limited to, server, PDA, workstation or PC.

A device according to the invention enables to communicate vibration data from the measurement device to the RFID receiver even as the measurement device is covered by a shielding layer, such as a layer of dust comprising metal or mineral. Another example of a shielding layer is a fluid. This is an advantage compared to previous known measurement devices for vibration measurement and wireless communication, which typically are based on radio communication in higher frequencies, which are substantially more sensitive to shielding layers.

Further the invention enables analyze of deviations of a normal vibration level of frequencies below 100 Hz, which are typical for unbalance, for instance of a fan impeller. Unbalance may also occur due to that a impeller of a fan is damaged or dirty. The invention enables analyze of deviations of a normal vibration level for frequencies mainly in the frequency band of 100-1000 Hz, which may be due to a defect of a bearing, and this is possible even though the measuring device is energized by the RFID receiver, and do not get energy from any other source.

Yet another advantage with the invention is that it enables presentation and the analysis of the vibration measurement and temperature measurement, where an increase in vibrations and an increase in temperature indicate a deviation. The invention improves the ability to detect changes relating to deviations from a normal condition of the at least one rotating member, where detection is performed before a defect of the member results in a break down of the machine. The measuring device is energized by the RFID receiver, and do not get any energy from any other source.

Another object of the invention is to present a system which enables a user to detect deviations from a normal status, which relates to at least one rotating member of a machine, where measurements are intended to be performed and communicated by means of a transponder, which is energized from a hand held receiver. The transponder does not get energy from any other source, such as a through a wire or cord. A user is intended to initiate measurements at inspection rounds in a plant. The transponder is identical to the previous mentioned measurement device.

The object is achieved by a system comprising the transponder intended to be mounted on the outside of the machine, the transponder comprises components for temperature and vibration measurement by means of the energy from a magnetic field. The system comprises a handheld RFID receiver configured to generate the magnetic field. The handheld RFID receiver comprise communication means configured to communicate with a second means of the transponder through the magnetic field. The RFID receiver comprises means to store temperature and vibration measurements associated to an identifier of the transponder and the RFID receiver comprises means to read the identity of the transponder. The system comprises a computer with connecting means configured to communicate with the RFID receiver and the computer comprise presentation means for trend curves intended to present deviations of the normal status relating to the at least one rotating member of the machine, where the presented deviation is based on temperature and vibration measurements performed by the transponder at a number of occasions.

In one aspect of the invention it increases the ability to identify deviations from normal status associated to at least one rotating member of a number of machines. This increased ability is due to that the invention enables analysis, not only due to repeated temperature measurements, but also on repeated vibration measurements, and the measurement device receives energy in a wireless manner. This makes it possible that in due cause, before a break down of the machine, identify the deviations, and this with an increased accuracy, through detection of increased temperature in addition to increased vibration of the machine. The deviation from normal status is made earlier than with previous known measurement devices and systems. Increase of temperature is common for instance at defects of bearings.

BRIEF DESCRIPTION OF THE DRAWINGS

The present invention will be described in more detail in connection with the enclosed schematic drawings.

DETAILED DESCRIPTION OF THE INVENTION

Figure 1:
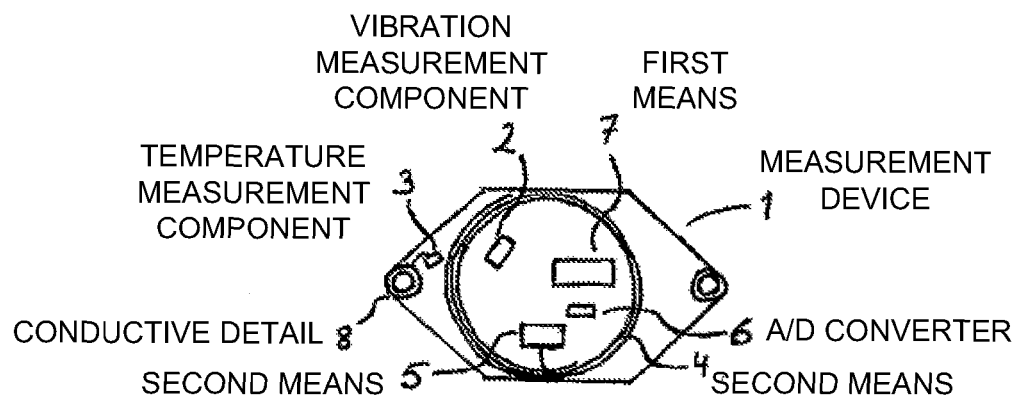
FIG. 1 shows an embodiment of the measuring device according to the invention. The figure shows an example of electronic components comprised in the measuring device.

FIG. 1 shows an example of a number of components 2, 3, 4, 5, 6, 7 mounted on a circuit board, or similar, in the measuring device 1. FIG. 1 shows a subset of the total number of components of a measuring device 1. The device shown in FIG. 1 is of a size that is suitable for a real world device. The size of the measuring device may vary depending on the type of application it is intended for. A suitable size of the device is a length of 2-10 cm and a thickness of 0.3-1 cm. The components for temperature measurement 3 and for vibrations measurement 2 may be of several different types. An example of a component for vibration measurement 2 is a 3-axis accelerometer, which is of an analogue or digital type. A suitable component intended for vibration measurement handles measurements at a sample frequency of 2-3 kHz. It is an advantage to use a 3-axis accelerometer with a 2.5 kHz samplings frequency. The first means 7, which is configured to initiate temperature and vibration measurement typically comprise a processor 7. Alternative terms of a processor is a CPU, a signal processor or similar. The first means 7 is activated when sufficient energy has been transferred by means of the magnetic field 21. The processor 7 and other components should be of types that meats requirements of low energy consumption and effect. A typical energy level which the measurement device 1 receives is equivalent of around 3V/100 mikroA. The measurement device 1 comprises an A/D converter 6. A suitable A/D converter 6 handles 10 bit. FIG. 1 shows that the device 1 comprises a second means 4, 5 configured to communicate the unique identity to the hand held RFID receiver 20. The RFID receiver 20 is a for the purpose designed receiver. In an embodiment the second means comprise a Radio Frequency (RF) 5 component that receives and sends data, and a coil 4.

FIG. 1 shows that the component for temperature measurement 3 may be connected to a ring shaped detail 8. Such a ring shaped detail 8 is intended to be attached to the machine 31 by means of screws, or similar. The ring shaped detail 8 is a made out of a material which has a high capability to transfer heat. An advantage with the ring shaped detail 8 is that it increases the quality of the temperature measurement. This due to that the component for temperature measurement 3 should have a reliable contact with the surface of the machine 31a. Other means of attachment of the device 1, such as by glue, are possible.

Figure 6:
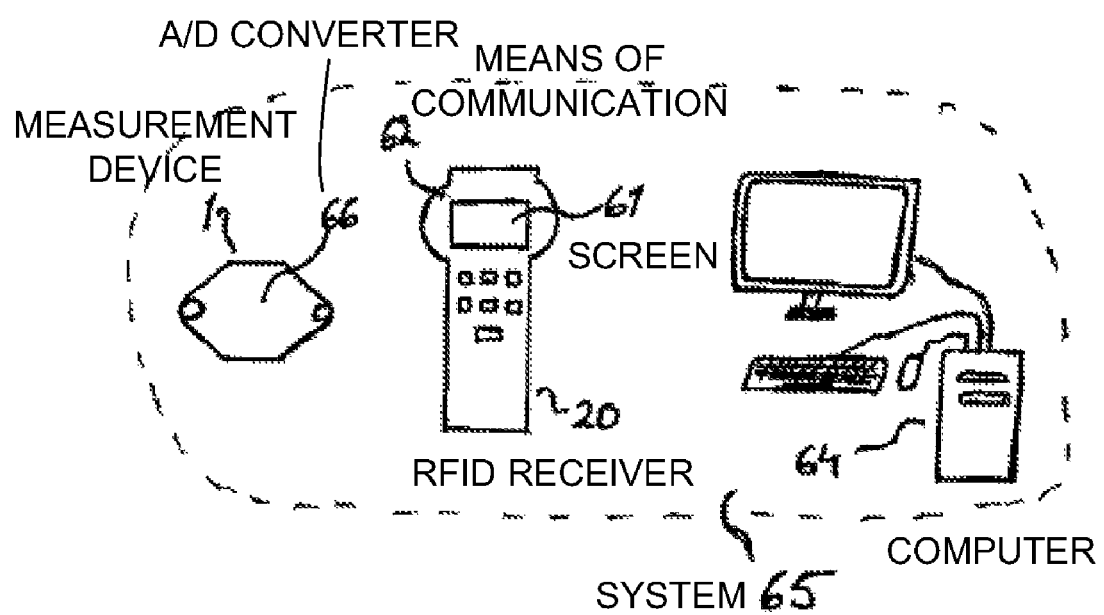
FIG. 6 is an overview of the system according to the invention comprising a transponder. The figure further shows an example of the handheld receiver and a computer to which measurement data is transferred, from the handheld RFID receiver, for storage and presentation on a screen.

The components of the device 1 are typically protected by a protective layer. FIG. 6 shows one embodiment of the measuring device 1, where the measuring device comprise one or several layers of a protective non-electrical leading material. An example of such a material is a co-polyamid based hot melt. FIG. 1 shows the measuring device without this layer. Other example of a protective layer is varnish. The material has characteristics such as low viscosity and short time to adhere. The hardness, is for instance, according to Shore A; 85 at 23 degrees Celsius. A suitable sagging point is at 154-166 degrees Celsius. Maximum resistance may be 2.5-4.5 mPa at 23 degrees Celsius. FIG. 1 shows an example of some of many possible electronic components.

In one alternative embodiment, a number of the components are arranged as an integrated circuit, this as an alternative to be mounted on a circuit board. The components may be combined in several ways. It may for instance be suitable to use a circuit which combines the processor with the A/D converter 6.

Further, FIG. 1 shows that a number of components are positioned inside the coil 4. The coil is typically made out of a material comprising substantial amount of copper and has the ability to operate as receiving, sending and manipulating antenna.

Figure 2:
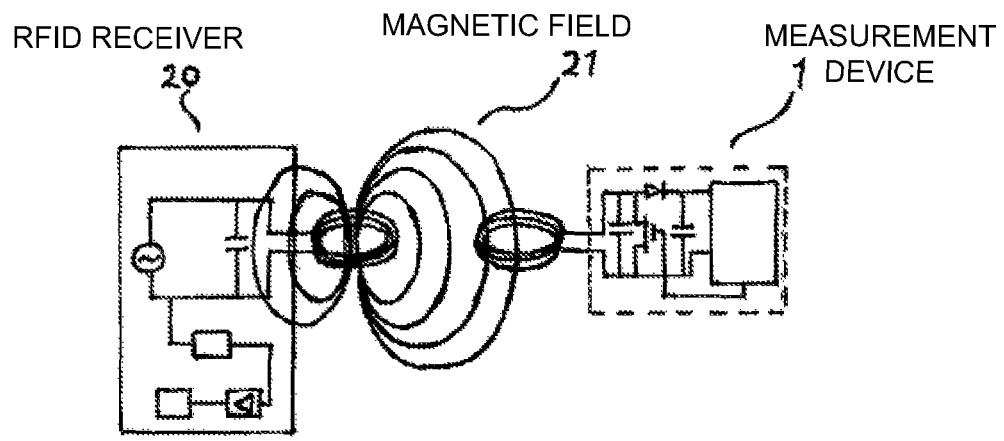
FIG. 2 is a schematic overview transfer of energy to the measuring device from the handheld receiver and the circuit of the measuring device integrating a direct current to threshold level before the measurement starts.
Figure 3:
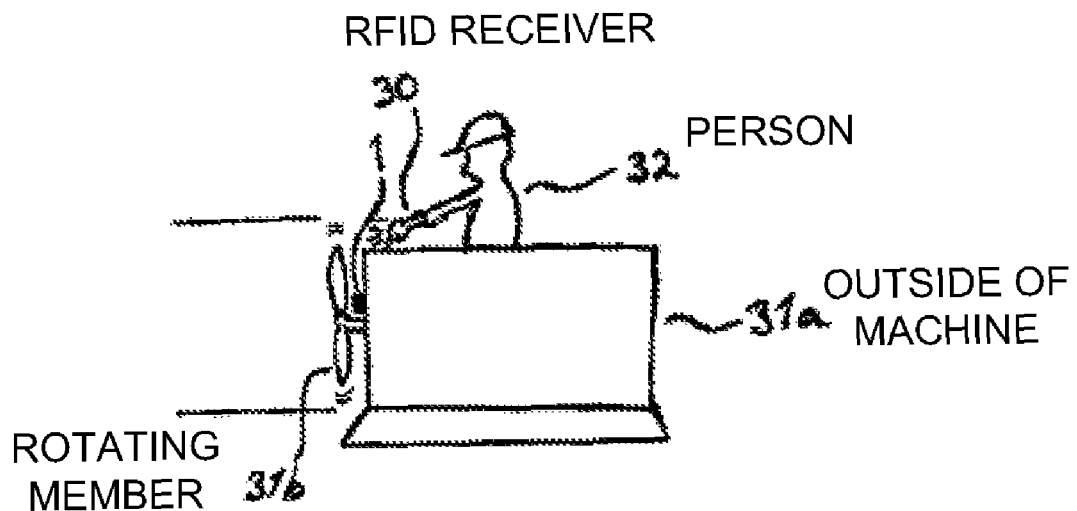
FIG. 3 shows an overview of a machine where the measuring device is mounted. A person performing an inspection round passes the machine and initiates measurement, reads the identifier of the measuring device and collects measurement data from vibration measurement as well as from temperature measurement.

FIG. 2 shows a schematic overview of transfer of energy to the measuring device 1 from the handheld RFID receiver 20 and a circuit of the measuring device 1. The circuit integrates a direct current (DC) to a threshold level before the measuring starts. The handheld RFID receiver 20 and the measuring device 1 comprise an antenna in the shape of a coil. The measuring device is typically passive, in a manner such that it is inactive and does not perform measurements unless the handheld RFID receiver transfers energy by means of the magnetic field 21. It is an advantage if the measuring device 1 comprises an inductive circuit in order to convert energy from the magnetic field 21 to electric energy. In a preferred embodiment the second means 4, 5 is arranged to communicate with a base frequency around 130 kHz. The maximum possible reading distance varies, for instance, depending on the size of the measuring device 1, or rather the size of its coil. Another factor is the size of coil/antenna of the RFID receiver 20. Typical distances are 2-100 cm.

The measuring device 1 sends data to the handheld RFID receiver by manipulating the magnetic field.

The handheld RFID receiver 20 of FIG. 2 comprises communication means for communication to the computer 64. Examples of such communication means is Ethernet 10/100 MB, Bluetooth, RS232 or RS485.

In an alternative embodiment the measuring device 1 comprise a circuit, for instance based on condensator technology, which stores energy transferred by the magnetic field 21. In such an embodiment the measuring device 1 performs measurements at a number of occasions, even when the measuring device 1 is not receiving energy from the handheld RFID receiver 20, 30, and communicates measuring data only with the RFID reader 20, 30.

An advantage with the device 1, compared to previous known devices and systems for wireless transfer of vibration data, is that the device has a high resistance against disturbances. Such characteristics are of particular importance in an environment, where the device is intended to be used, having electromagnetic sources generating significant disturbances. Examples of such environments are areas close to powerful electric motors (>50 kW) in a rolling mill, in a plant refining mineral or other process industry. The ability to withstand disturbances depends on that the measuring device and the handheld RFID receiver 20, 30 communicates by means of a magnetic field over short distances, such as on arm length distance.

Figure 4:
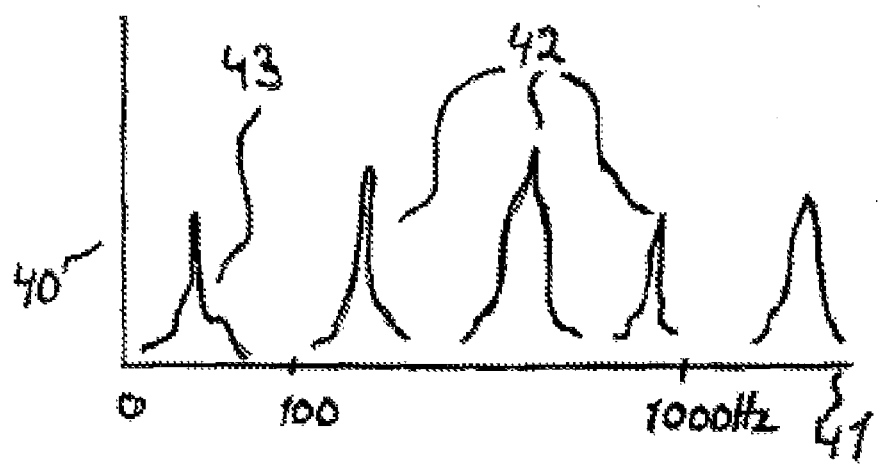
FIG. 4 is a graph that shows a simplified vibration spectrum of a machine.

FIG. 4 is a graph which shows a simplified spectrum of vibration 42, 43 from a machine. 1-1000 Hz is typically the main frequencies where vibration measurements are performed by means of the measuring device.

It is an advantage if the component for vibration measurement has a sampling frequency of 2000-3000 Hz. A component which has proven to be particular suitable to use in an embodiment has a sampling frequency of 2500 Hz. In an embodiment of the invention the processor 7 is configured to calculate a value corresponding to the energy of the vibrations spectrum at the time of the vibration measurement. In such an embodiment a value is intended to be transferred from the handheld RFID receiver 20, 30 which corresponds to the energy of the total spectrum shown in FIG. 4. An advantage with such an embodiment is that the amount of energy consumed to communicate the value is modest. This compared to the energy needed to communicate bands of the total spectrum, as the one in FIG. 4. Such a measurement results in an indication if some member of the machine is failing, such as a bearing. When a 3-axis accelerometer is used for vibration measurement it is suitable that the calculation of the value is based on an RMS calculation performed by the processor of the measurement device 1. An RMS value may be calculated for each of the three axis, and then added to one value. Depending on the application it may be suitable that the measurement device 1 comprise a band pass filter, alternatively a low pass filter, in order to improve data quality of the vibration measurement. A band pass filter is for instance suitable to be used when the aim is to monitor a specific band of frequencies, in which a certain type of fault of a bearing has previously been identified.

In an alternative embodiment the processor 7 is configured to calculate a value corresponding to the energy in each of the axis where the accelerometer measures vibrations. Such an alternative embodiment that corresponds to that 3 values are communicated. As previous mentioned, the calculations may be performed by another type of component, such as a signal processor performing FFT calculations.

The measuring device communicates a number of groups of samples at a number of occasions. As an example 1, 10 or 50 samples may be sent on each occasion, repeated a number of times. This in order to enable the hand held RFID receiver 20 to add these groups of samples to a long series of measurement data. One known approach to achieve that is to use interleave sampling. This enables that at least some parts of the frequency spectrum may be analyzed by the computer, for instance by means of FFT analysis. It is known that typical deviations of certain bearings appears at specific frequency spectra, for instance at 800-900 Hz. In this type of approach it is an advantage if the absolute time of the first sample in a group of samples, the sample frequency, and the time between these groups either can be saved or calculated.

Temperature and vibration measurements performed by the measuring device 1 are typically intended to be sent in conjunction of each other. As previous mentioned the identity measured data is communicated in a digital format, by means of the magnetic field between the measuring device 1 and the hand held RFID receiver. It is an advantage if the broadcast from the measuring device begins with a transfer of information of format of other data to be sent in the broadcast. An example of a name of such information is a frame. An example on a size of a broadcast is 3 bytes and a checksum. There are several alternative names of a byte, such as a package or a message. Examples of order of such bytes are: One byte for a frame, one byte for data from vibration measurement and one byte for data from temperature measurement. In an embodiment where the measuring device 1 is configured to transfer more than one value relating to measurements, there are usually several bytes used to transfer data. It is in advantage if data relating to the identifier is received by the RFID receiver 20, before data relating to measurements are received. This enables the RFID receiver to relate measurement data to the identity. Time stamping of measurement data may be performed by the RFID receiver 20.

Figure 5A:
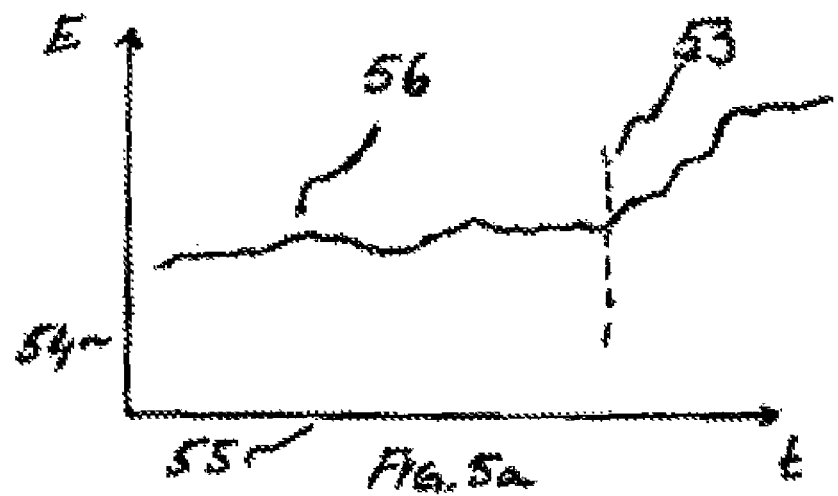
FIG. 5a shows an example of a trend curve over vibration measurements performed with the measurement device at repeated inspection rounds. The trend curve is presented by means of the computer in the system according to the invention. The trend curve may be configured in many different forms.

FIG. 5a shows an example of a trend curve 56 of vibration measurement performed by the measurement device 1 at repeated inspection rounds. The trend curve 56 is presented by means of the computer 64 of the system 65 according to the invention. The trend curve 56 may be drawn in many different ways. The trend curve 56, for instance presented on an LCD screen, and which relates to vibration measurement of the machine 31a is typically assembled by measuring data transferred from the hand held RFID receiver to the computer at a number of occasions. The time resolution 55 in FIG. 5a is in general the same as the time interval inspection rounds, for instance two hours. The time between the inspection rounds may vary. The trend curve 5a may also be presented on the RFID receiver 20. A sudden change of vibration level 53 indicates that a deviation from a normal status has occurred.

Figure 5B:
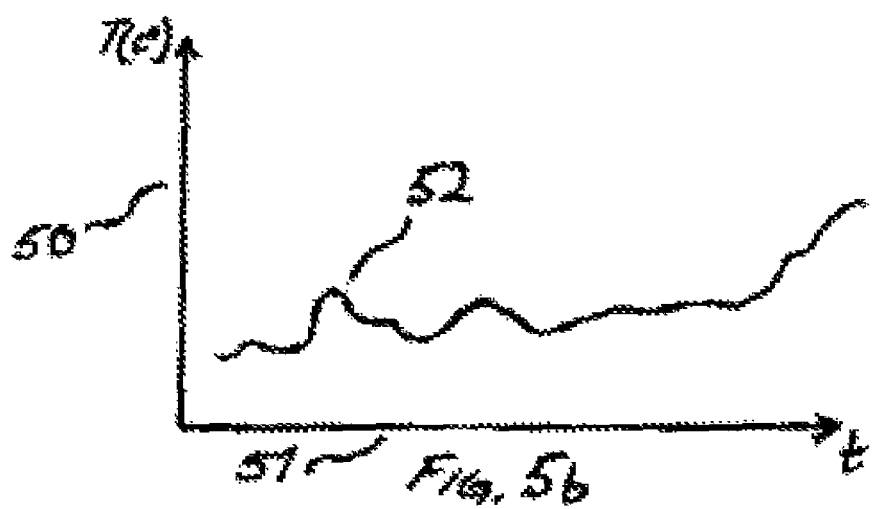
FIG. 5b shows an example of a trend curve over temperature measurements performed with the measurement device at repeated inspection rounds. The trend curve is presented by means of the computer in the system according to the invention. The trend curve may be configured in many different forms.

FIG. 5b shows an example of a trend curve 52 over the temperature measurement performed by the measuring device 1 at repeated inspection rounds. The trend curve 52 is typically presented by means of the computer 64 of the system 65 according to the invention. An increase of temperature may be due to that incorrect oil, or other lubricant, has been added to the rotating element, such as a bearing.

Figure 5C:
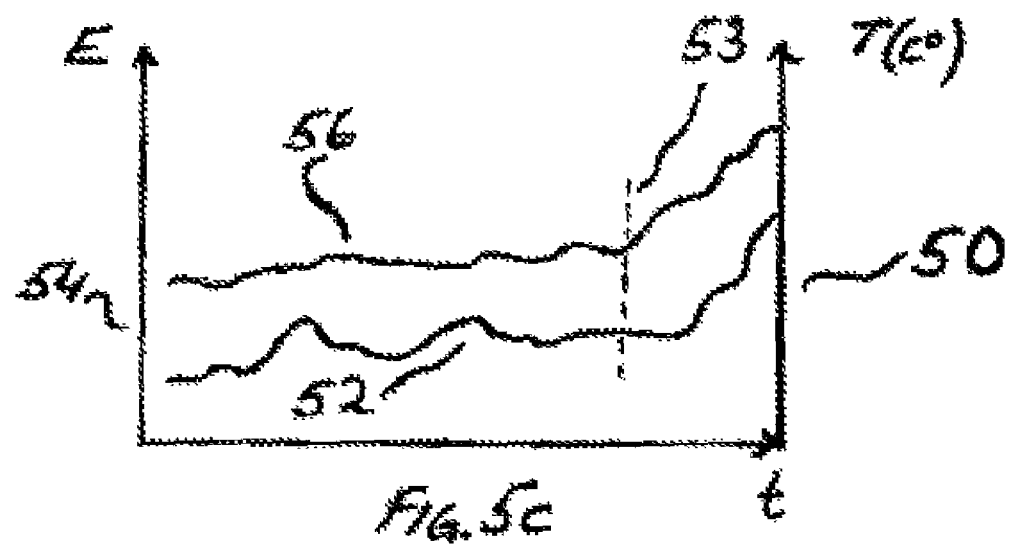
FIG. 5c shows an example of a trend curve over vibration measurements and temperature measurements performed with the measurement device at repeated inspection rounds. The trend curve is presented by means of the computer in the system according to the invention.

FIG. 5c is an example of a trend curve of the vibration measurement 56 and the temperature measurement 52 performed by means of the measurement device 1 at repeated inspection rounds. The trend curves 56, 52 are typically presented by means of the computer 64 of the system 65. An advantage with the invention is that it facilitates the detection of a deviation of a normal status, starting at the time of indication 53 in FIG. 5c. This as vibration measurement 56 and temperature measurement 52 often both indicates an increase.

FIG. 6 is an overview of a system 65 according to the invention comprising a transponder 1. Further FIG. 6 shows an example of the hand held RFID receiver 20 and a computer to which measurement data is transferred, for instance for storage and presentation on a screen.

The means of communication 62 comprised in the hand held RFID receiver 20 comprises a coil. The coil is of a size substantially larger than the transponder 1 in the coil. The rounded shape of the coil is typically visible as a rounded front of the RFID receiver 20 which typically has a rounded front, which is seen in FIG. 6.

The invention is not limited to the described embodiments and figures, but can be varied within the scope of the claims.

The invention claimed is:

1. A measurement device (1) for measurement and communication of measurement data, intended to be mounted on the outside of a machine (31) comprising at least one rotating member and the measuring device (1) is intended to measure and communicate measurement data relating to the condition of the rotating member, the measurement device (1) comprising:
a component for temperature measurement (3) and a component for vibration measurement (2) in at least the frequencies 1-1000 Hz,
first means (7) configured to activate the components for temperature and vibration measurement, the first means (7) being configured to be energized by an introduced magnetic field (21) and to process vibration measurement data from the component for vibration and communicate the vibration measurement data as one value related to total energy of vibration, and
second means (4, 5) configured to communicate a unique identifier, data from the temperature measurement and the value relating to the total energy of vibration to a handheld RFID receiver (20).

2. The measurement device (1) according to claim 1, wherein the second means (4, 5) is configured to communicate data from the temperature and vibration measurement by interacting with the introduced magnetic field (21).

3. The measurement device (1) according to claim 2, wherein the measurement device further comprises an accelerometer (2) and the first means comprises a processor (7) covered in a protective non-conductive material.

4. The measurement device (1) according to claim 3, wherein the second means (4, 5) comprises a coil (4) which is positioned around the accelerometer (2) and the processor (7).

5. The measurement device (1) according to claim 1, wherein the component for temperature measurement is connected to a ring shaped electrically conductive detail (8), where the detail is adapted to be attached to the machine (31) by means of a screw.

6. The measurement device (1) according to claim 1, wherein the measurement device (1) does not use energy from a battery or from a wired electric connection, to communicate measurement data.

7. The measurement device (1) according to claim 1, wherein the temperature and vibration measurement is performed while the magnetic field (21) is introduced to the measurement device (1), and not otherwise.

8. A system (65) to detect deviations from a normal condition relating to at least one rotating member of a machine (31) and measurements relating to the condition is intended to be initiated by a user (32) at inspection rounds at a plant, the system comprising:
a transponder (1) intended to be attached on the outside of the machine (31), the transponder comprises components for temperature and vibration measurement (2, 3), the transponder (1) further comprises a first means (7)

configured to activate temperature and vibration measurement by means of energy from an introduced magnetic field (21), a handheld RFID receiver (20) configured to introduce the magnetic field (21), the handheld RFID receiver (20) comprises communication means (62) configured to communicate with a second means (5) in the transponder (1) by means of the magnetic field (21), the RFID receiver comprises means to store the temperature and vibration measurement associated with an identity (66) of the transponder, the handheld receiver (20) comprises means to read the identity of the transponder (1), a computer (64) comprising connection means configured to communicate with the handheld receiver (20), and the computer (64) comprises presentation means suitable for trend curves intended to indicate deviations from the normal condition relating to the at least one rotating member of the machine (31), where the indicated deviation is based on temperature and vibration measurement performed by the transponder (1) at a number of times.

9. The system according to claim 8, wherein the second means (5) is configured to communicate data from temperature and vibration measurement by interacting with the introduced magnetic field (21).

10. The system according to claim 8, wherein the first means is configured to process data from the vibration measurement in at least the frequencies 1-1000 Hz and wherein data of the vibration measurement is sent as one value relating to the total energy of vibrations.

11. The system according to claim 9, wherein the transponder (1) further comprises an accelerometer (2) and the first means comprises a processor (7) covered in a protective nonconductive material.

12. The system according to claim 11, wherein the second means (4, 5) comprises a coil (4) which is positioned around the accelerometer (2) and the processor (7).

13. The system according to claim 8, wherein the component for temperature measurement is connected to a ring shaped electrically conductive detail (8), where the detail is adapted to be attached to the machine (31) by means of a screw.

14. The system according to claim 8, wherein the measurement device (1) does not use energy from a battery or from a wired electric connection, to communicate measurement data.

15. The system according to claim 8, wherein the temperature and vibration measurement is performed while the magnetic field (21) is introduced to the measurement device (1), and not otherwise.

16. The measurement device (1) according to claim 2, wherein the component for temperature measurement is connected to a ring shaped electrically conductive detail (8), where the detail is intended to be attached to the machine (31) by means of a screw.

* * * * *